United States Patent [19]

Hill et al.

[11] 4,257,452

[45] Mar. 24, 1981

[54] BIASED OPEN DIRECT RESPONSE VALVE WITH DAMPING MEANS

[75] Inventors: Donald C. Hill, Pasadena; Robert W. Lyall, South El Monte, both of Calif.

[73] Assignee: R. W. Lyall & Co., Inc., Santa Fe Springs, Calif.

[21] Appl. No.: 6,268

[22] Filed: Jan. 25, 1979

Related U.S. Application Data

[63] Continuation of Ser. No. 600,856, Jul. 31, 1975, abandoned, which is a continuation-in-part of Ser. No. 535,185, Dec. 23, 1974.

[51] Int. Cl.³ .............................................. F16K 21/10

[52] U.S. Cl. ................................ 137/514.7; 137/517; 137/625.37

[58] Field of Search ..................... 137/220, 498, 514.5, 137/514.7, 517, 546, 625.37

[56] References Cited

U.S. PATENT DOCUMENTS

| | | | |
|---|---|---|---|
| 469,996 | 3/1892 | Evans | 137/517 |
| 1,060,142 | 4/1913 | Stevens | 137/517 |
| 1,164,600 | 12/1915 | Forster | 137/625.37 |
| 1,181,435 | 5/1916 | Cartwright | 137/546 |
| 2,307,949 | 1/1943 | Phillips | 137/498 |
| 2,917,077 | 12/1959 | Ziege | 137/514.17 |
| 3,085,589 | 4/1963 | Sands | 137/498 |
| 3,200,214 | 8/1965 | Aubert | 251/65 |
| 3,233,625 | 2/1966 | Pase | 251/65 |
| 3,468,338 | 9/1969 | Patterson | 251/65 |
| 3,716,069 | 2/1973 | Reynolds | 137/546 |
| 3,732,889 | 5/1973 | Conery et al. | 137/498 |

*Primary Examiner*—William R. Cline

*Assistant Examiner*—H. Jay Spiegel

*Attorney, Agent, or Firm*—Cole, Jensen & Puntigam

[57] ABSTRACT

A very reliable, trouble-free, safety shut-off is provided by a poppit valve arranged so that it can be included in series in a flow line. The head of the poppit is mounted upstream from the seat. It is biased open so that fluid can flow through the line at any rate from zero up to some maximum flow velocity. Flow through the valve is arranged so that it impinges upon the valve head, or something fixed to the valve head, whereby kinetic energy is lost at the head. That kinetic energy is used to move the valve head toward the seat until the spacing between them becomes so small that flow velocity is restricted. At that time, velocity through the valve is increased to the point where a large pressure drop appears across the valve and the static head of the fluid is used to force the valve closed and to maintain it closed. A dash pot develops viscous friction which is used both to damp any tendency of the head to oscillate and to prevent valve operation in response to short term transients or perturbations.

Constructing the valve so that it is symmetrical about a center line and constructing it so that approaching flow is directed to the outer peripheral areas of the flow path, and then re-directing flow back into the central area of the flow path through the valve, results in a flow configuration that minimizes criticality in the selection of mass and bias and damping rate values.

By confining the dash pot and biasing members such that they are isolated from gas flow, the shut-off is made useful for controlling flow of gasses which carry along fine grains of sand and other particulate material.

8 Claims, 13 Drawing Figures

FIG. 1
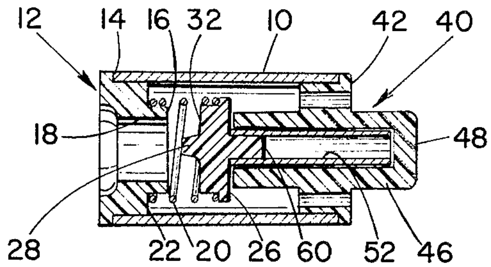
FIG. 2
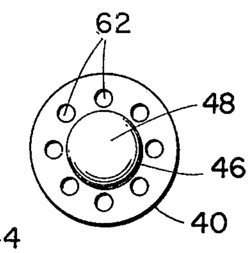
FIG. 3
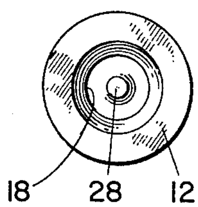
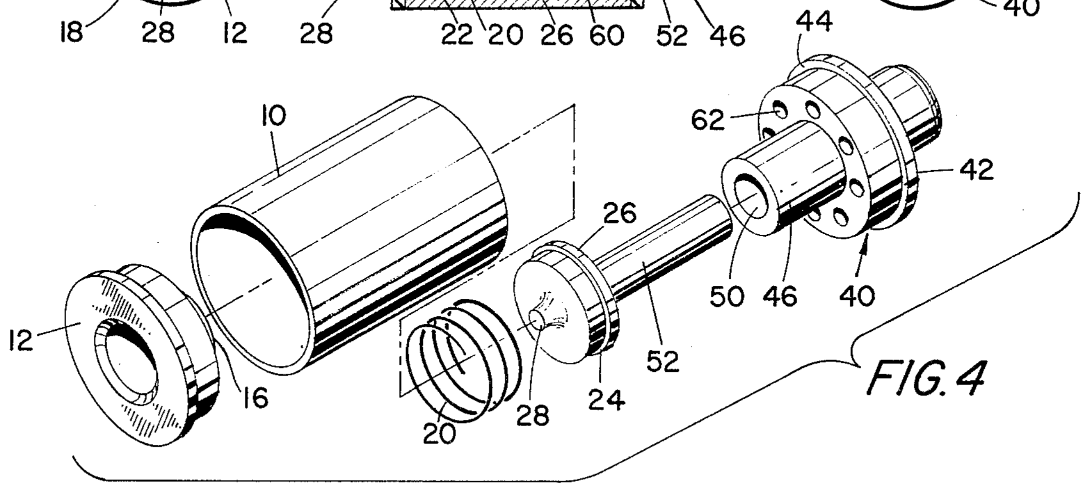
FIG. 4
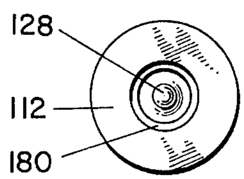
FIG. 7
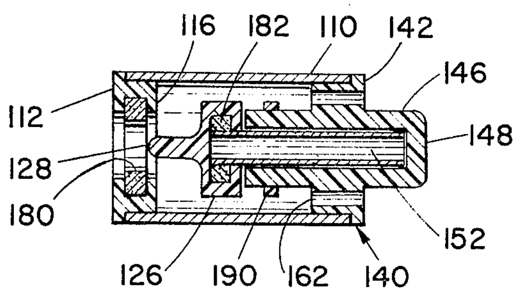
FIG. 5
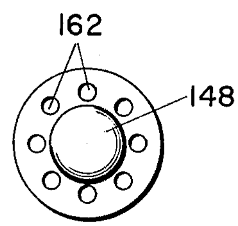
FIG. 6
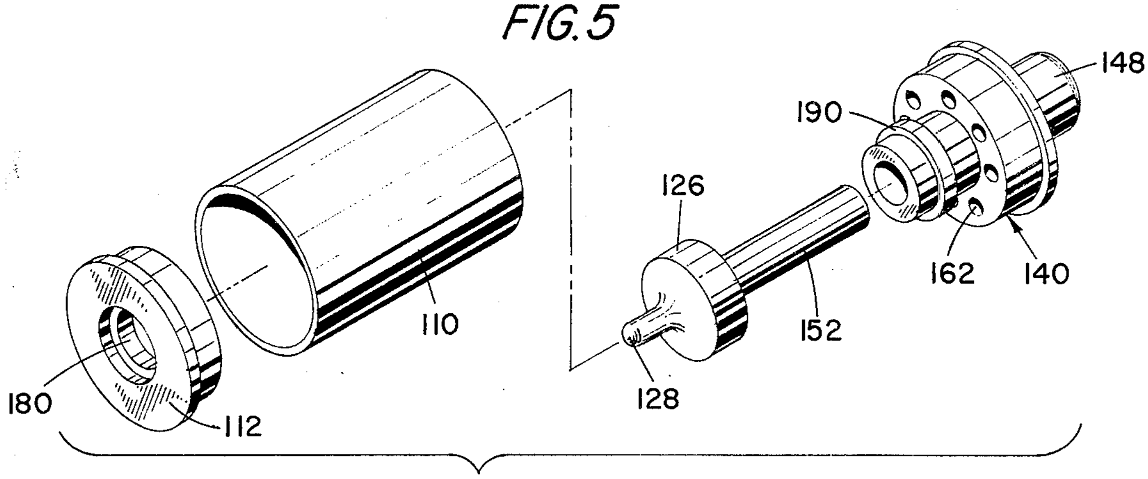
FIG. 8

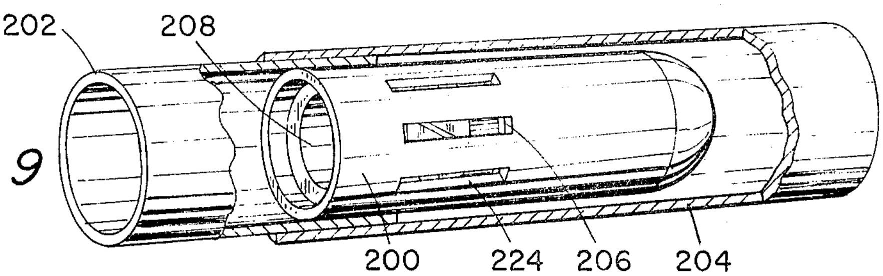
FIG. 9
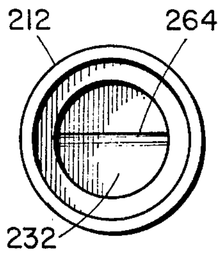
FIG. 11
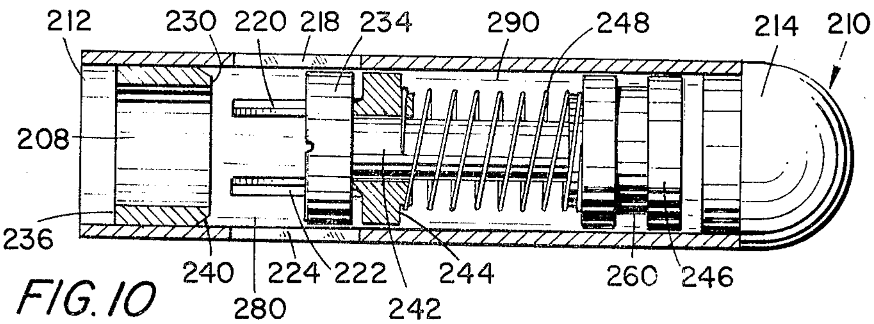
FIG. 10
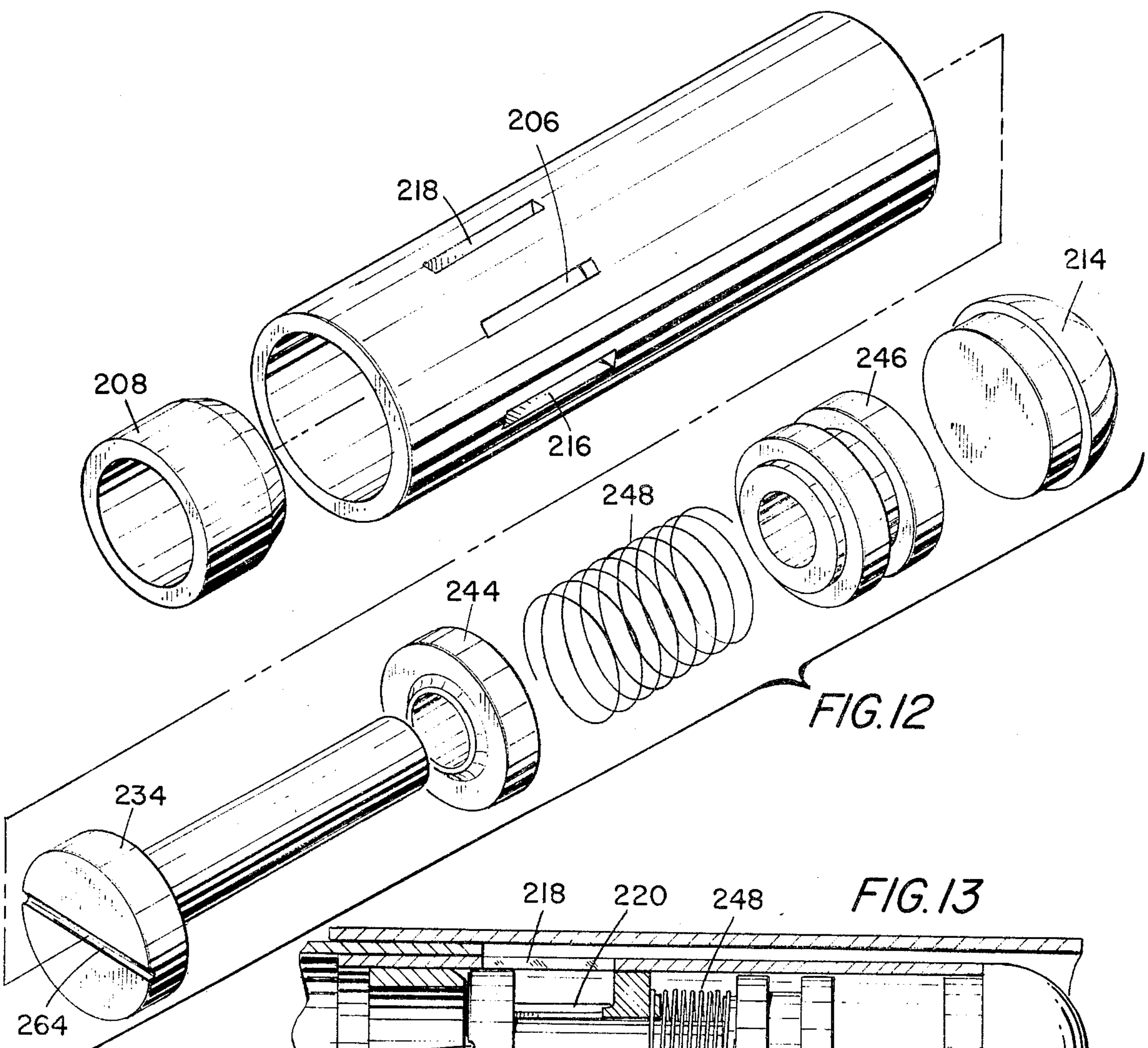
FIG. 12
FIG. 13
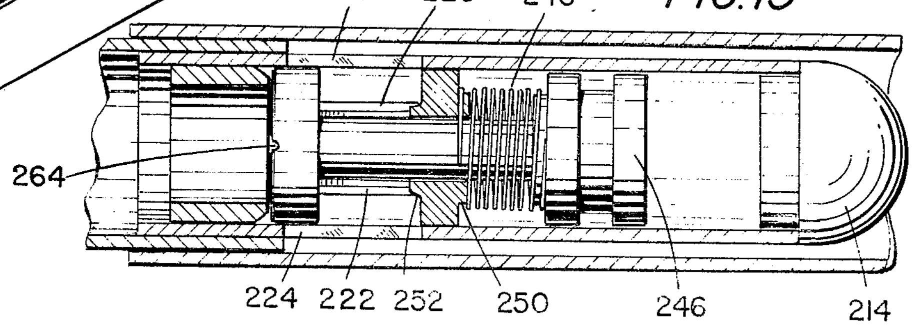

BIASED OPEN DIRECT RESPONSE VALVE WITH DAMPING MEANS

REFERENCE TO RELATED APPLICATION

This is a continuation of application Ser. No. 600,856, filed July 31, 1975 now abandoned, which is a continuation-in-part of application for U.S. Pat. Ser. No. 535,185, filed Dec. 23, 1974 for IMPROVEMENTS IN VALVES by Donald C. Hill and Robert W. Lyall.

This invention relates to improvements in safety shut-off valves. It relates particularly to a delayed action valve responsive to flow velocity and pressure differential.

There are a number of situations in which it is desirable to include a normally open valve in a flow line so that the valve will be closed to preclude flow in the event that flow velocity becomes excessive as an incident to reduced downstream pressure such, for example, as may occur if the downstream line should be broken.

The invention is applicable to fluid lines generally, whether they be gas lines or liquid lines. First, the kinetic energy and then the static head of the fluid to be controlled is utilized to actuate valves made according to the invention. Because of that approach, the more difficult problem is presented in controlling gas flow because of the lesser mass of gas. The problem becomes particularly difficult where the line pressure is relatively low as it is, for example, in distribution systems that supply gas to residences. While not limited to the application, the invention is well suited to that purpose. Accordingly, the embodiments of the invention selected for illustration and specific description here are valves that are designed for that particular application. It is to be understood, however, that the invention has wider application.

It is, in fact, one of the objects of the invention to provide a safety valve structure which can be readily adapted for use in fluid lines carrying any of a wide range of liquids and gasses. Another object is to provide a safety valve which is dependable and reliable and which can be placed in series in a fluid line for long periods without danger of deterioration or loss of function. Another object is to provide in-line automatic shut-off valve which is suitable for applications, such as in consumer gas distribution systems, in which wide fluctuation in flow velocity is common. In that application, as in many others, changes in velocity are likely to occur suddenly. Another object of the invention is to provide a valve in which response to rate of change of velocity is controlled so that flow is not cut off by short term flow velocity increases, notwithstanding that they exceed maximum permitted steady state velocity. Nonetheless, valves made according to the invention respond rapidly to shut-off flow when velocity suddenly increases greatly and to provide that kind of operation is still another object of the invention.

These and other objects and advantages of the invention which will hereinafter appear are realized in part by the provision of a poppit valve in which the poppit head moves toward and away from the valve seat on an axial line perpendicular to the face of the seat. The head is mounted upstream of the seat and a means is included for biasing the head away from the seat to normally open position. The valve structure includes a means for urging the head toward the seat against that bias as a function of fluid head. Until the valve is closed, the fluid head includes both a dynamic and a static component. When the valve is closed, it is maintained closed by the static head. The invention also includes a damping means for opposing head movement in a degree variable with the velocity of head movement.

In the drawings:

FIG. 1 is a view in central cross-section of a valve which embodies the invention;

FIG. 2 is a view of the upstream end of the valve of FIG. 1;

FIG. 3 is a view of the downstream end of that valve;

FIG. 4 is an exploded, isometric view of the parts of the valve of FIG. 1;

FIG. 5 is a view in central cross-section of a modified form of valve which embodies the invention;

FIG. 6 is a view of the upstream end of the valve shown in FIG. 5;

FIG. 6 is a view of the upstream end of the valve shown in FIG. 5;

FIG. 7 is a view of the downstream end of the valve of FIG. 5;

FIG. 8 is an exploded, isometric drawing of the parts of the valve of FIG. 5;

FIG. 9 is an isometric view of a valve of another form which embodies the invention shown in a sectioned gas line;

FIG. 10 is a cross-sectional view of the valve of FIG. 9 shown in fully open condition;

FIG. 11 is a view of the downstream end of the valve of FIG. 9;

FIG. 12 is an exploded view of the valve of FIG. 9; and

FIG. 13 is a cross-sectional view of the valve of FIGS. 9 and 10 shown in almost fully closed condition.

Both of these valves are arranged for inclusion in series of a fluid flow line. Both of them are symmetrical around a central axis. While not essential to successful practice of the invention, that symmetry is an important feature of the construction because it minimizes the number of design parameters that have significant effect on operation and because it tends to avoid relative criticality in the several design parameters. As a consequence, the task of extrapolating the design from one application to another is greatly simplified.

In FIG. 1, the valve is housed in a cylindrical body or sleeve 10. The downstream end wall 12 is formed by a plug which is symmetrical around its central axis. The outside wall of that plug is stepped to successively smaller diameter in the upstream direction. The larger diameter is substantially equal to the outside diameter of sleeve 12. At the first step, the diameter is reduced to a value corresponding to the inside diameter of sleeve 12. That arrangement results in the formation of a shoulder 14. The plug 12 is inserted so that the shoulder 14 bears against the downstream end of the sleeve 10. That fixes the position of the valve seat 16 which is formed by the inner surface of plug 12. A large axial opening in the plug serves as the flow path through the seat. For identification, the wall of that flow path opening has been marked with the reference numeral 18. The seat 16 is formed by the rim of the plug where it surrounds that flow opening.

The second step in the outside diameter of the plug 12 occurs adjacent to the inner or seat end of the plug. That end of the plug serves as a gland to receive the end of a bias spring 20. The downstream end of the spring rests against the shoulder 22 formed by the second step.

The other end of the bias spring rests against a shoulder 24 (see FIG. 4) formed on the exterior surface of the valve head 26. In this embodiment, the valve head is generally disc shaped and is symmetrical about an axis which is substantially coincident with the axis of the seat 16. The downstream end of the valve head has reduced outer diameter. To form the shoulder 24 against which the upstream end of the bias spring bears, the forward end of the valve head has an outside diameter substantially equal to the inside diameter of the spring so that that forward part of the disc serves as a spring gland or spring retainer.

It is desirable that turbulence in the fluid be controlled, be minimized once it has passed into the seat opening. To this end, the downstream face of the valve head disc is shaped in a way that tends to eliminate turbulence. In this case, a projection 28 extends forwardly from the valve head. That projection is symmetrical about the axis of the head and it has generally streamline shape tapering to small diameter toward its outer end.

A means is provided in the invention for mounting the head so that it is confined to movement in the axial direction, toward and away from the seat. Like the seat 16, the forward face 32 of the valve head lies in a plane perpendicular to the line of valve head movement so that the valve is closed when the surface 32 of the head engages the seat 16. That support means is formed by a structure that is fixed relative to the outer sleeve 10. It can be mounted either at the upstream side or the downstream side of the valve head. There is an advantage in mounting it upstream from the head. It is that arrangement that is shown in FIG. 1 where the head mounting means forms part of a structure that performs not only that function but some others.

The upstream end of the sleeve 10 is fitted with a head mounting or upper plug generally designated 40. In this case, the member 40 is comprised of a single piece, although it could be assembled from several parts. It includes a disc shaped portion 42 whose outer diameter is stepped so that the forward portion of the outer wall has an outside diameter corresponding to the inside diameter of sleeve 10. Upstream from that, the outside diameter of the disc 42 corresponds generally to the outside diameter of sleeve 10. The step in diameters results in the formation of a shoulder 44. The member 40 is inserted into the upstream end of sleeve 10 so that the shoulder 44 bears against the upstream end rim of the sleeve. The disc portion 42 of the upper plug 40 surrounds an integrally formed cylinder 46. The wall of that cylinder surrounds a bore whose axis is substantially coincident with the axis of seat 16 and head 26. The upstream end of the bore is closed by an end wall 48. The downstream end is open and is visible in FIG. 4 where the surface of the bore is identified by the reference numeral 50. That bore is open to receive a piston 52 which is fixed to the valve head 26 and extends upstream from the valve head. The piston 52 has its axis coincident with the axis of the head and of the bore 50.

The bore 50 and the piston 52 cooperate to form dash pot. In this case, the dash pot arrangement is one that is designed for use where the fluid being controlled is a gas. One of the structural arrangements that is commonly used in a liquid environment could be substituted when the device is to be used in a liquid line. In this case, the piston 52 is a length of tubing. The inner end of the tubing is press fitted over a boss 60 which extends rearwardly from the valve head.

The cylinder 46 is arranged so that a substantial portion of it extends upstream from the disc portion 42. That construction is employed so that flow will be directed without undue turbulence to the several flow openings which extend through the plug disc 42. For identification, some of those openings have been numbered 62 in the drawing. Those openings are spaced symmetrically around the cylindrical portion of the plug 40. They extend on axes that are substantially parallel to the axis of the unit and they have a combined area such that they present minimum resistance of flow through the unit. Their purpose is to direct streams of fluid toward the rear surface of the valve head 26.

The diameter of the valve head disc exceeds the diameter of the cylinder 46 so that the outer marginal area of the rear face of the valve head is exposed to flowing fluid. The area of the flow path through the unit and past the head, is sufficiently large so that the fluid is not accelerated as it passes between the valve head disc and the outer wall of the flow path. Nonetheless, some of the fluid that approaches the valve head impinges on its rear surface, resulting in a reduction of velocity and a loss of kinetic energy. That loss is used to accomplish movement of the head in the downstream direction against the bias of sprig 20. As the velocity of flow through the valve increases, the kinetic energy loss is increased. Finally, at some velocity, the head approaches the seat. At some point, as the head approaches the seat closely, the area of the flow path is diminished so that the fluid must accelerate greatly in passing between the head and seat. When that happens, the flow rate is diminished and the kinetic energy loss at the back of the head is reduced. However, at that time, the pressure differential across the valve increases and the static head is used to complete closure of the valve.

That description of valve operation presupposes first that the increase of flow velocity through the valve was occasioned by a reduction of downstream pressure and second, that presure reduction is continued so that the valve will be maintained closed by the pressure upstream of the valve. If downstream pressure subsequently approaches upstream pressure such that the force of the bias spring plus the downstream pressure equals the upstream pressure, then the head will reopen and communication through the valve will be reestablished.

Thus it is that the valve responds to a large reduction in downstream pressure to shut off flow completely. If the downstream pressure reduction is less, the valve serves as a flow velocity limiter. In such a case, movement of the head toward the seat is arrested by the increased bias force before the area of the path between head and seat becomes so small that Venturi action becomes predominant. In that mode of operation, the valve tends to limit flow velocity to some maximum value.

The foregoing discussion of valve action has neglected consideration of the rate of change of downstream pressure and the rate of change of flow velocity. Under certain circumstances of rapid change, the valve head would oscillate, or chatter. To eliminate that effect, as well as to limit the speed of valve response such that the valve will not close in response to large but short term, transient changes in pressure, damping is added to the system in the preferred embodiment. The combination of the resilience of the bias spring and the mass of the valve head, and to some extent the mass of the gas within the valve, results in a structure that will oscillate. The addition of damping also solves that problem. The valve head is connected to the moving element of a dash pot. The dash pot develops a resistance to valve head movement which varies as a direct function of the velocity of valve head movement. In the case of FIG. 1, the interior of the piston sleeve 52 will be filled with fluid of the kind that passes through the valve. If the head is moved in the downstream direction toward the seat, the effect is to increase the volume within the cylinder. That tends to reduce the pressure in the interior of piston sleeve 52 so that movement of the valve head is opposed until additional fluid can flow between the inner wall of the cylinder 46 of the outer wall of the piston sleeve 52. In the design shown, motion of the valve head in both directions is opposed by the dash pot. As a consequence, if the valve head is completely closed, it will not open in response to a short term transient increase in pressure downstream. While the head would tend to move away from the seat, the degree of movement would be sufficiently small so that the valve would be reclosed by static head if the pressure increase was only transient. Thus, inclusion of the dash pot delays response both in the valve closing and in the valve opening directions.

While the piston sleeve 52 has been referred to as the piston in FIG. 1, the fact that it is hollow means that the effective piston length is only slightly greater than the length of the boss 60 on which the sleeve is mounted. In the embodiment of FIG. 2, the interior of the piston sleeve is completely filled so that the fluid chamber is smaller, resulting in greater friction and "stiffer" action. In FIG. 2, the dash pot piston is designated by the reference numeral 152. It fits within a dash pot cylinder 146 which is closed at its upstream end by an end wall 148. As in the case of the embodiment of FIG. 1, the dash pot cylinder 146 is an integral part of an end plug 140, part of which is a disc 142 having a stepped outer diameter to form a shoulder which abuts against the upstream end of the outer body or sleeve 110 when the plug 140 is inserted in the upstream end of the sleeve. As in the case of plug 40, the plug 140 is formed with a series of flow openings 162. There are eight of them and they are equally spaced around the dash pot cylinder. In this case, the piston of the dash pot is formed by a metal sleeve the interior of which is filled by plastic rod. That whole assembly is called the piston and is designated by the reference numeral 152. At the forward end, piston 152 is press fitted into a bore or recess in the rear face of the valve head 126. In this embodiment, the outer surface of the head is not stepped to different diameters. That is not necessary because in this embodiment, there is no spring biasing arrangement. Instead, force to bias the head toward open position is provided by a pair of ring magnets, one of which is encapsulated in the valve head where it surrounds the inner end of the piston 152. The other ring magnet 180 is molded into the plastic end plug 112. The axis of the magnet is coincident with the axis of the valve seat. The seat is formed by the forward face 116 of the plug 112. The central opening of the magnet 180 serves as a flow opening through the seat. The magnet that is encapsulated in the head is identified by the reference numeral 182. These two magnets are oriented so that they oppose one another. As a consequence, the head is forced back away from the seat by magnetic force. That force diminishes as the square of the distance between the two magnets. That is different from the action of FIG. 1 where the bias is provided by a spring. The spring obeys Hooke's law. In the case of the spring, the force that tends to keep the valve open is inversely proportional to the first power of distance between the seat and head.

As in the case of the valve of FIG. 1, the forward face of the valve head 126 is provided with an extension 128 having generally streamlined configuration. The purpose of that extension is to minimize turbulence in the fluid as it passes between the valve head and valve seat into the outlet opening. It is intended that this valve permit a range of flow rates less than is permitted in the valve of FIG. 1. To provide that kind of operation, the valve of FIGS. 4 through 8 is provided with a means for utilizing more of the kinetic energy of the flowing fluid. It does that by creating a turbulence in the fluid as it approaches the rear surface and the outer circumference of the valve head 126. Turbulence is produced by placing a ring, 190, around the inner end of the dash pot cylinder 146 just upstream from the rear face of the head 126. Fluid flowing through the openings 162 is engaged by that ring and turbulence is produced which has the effect of directing a larger proportion of the total flow against the rear face of the valve head 162. Changing the size of the ring 190 changes the degree of turbulence and the maximum flow velocity through the valve that is permitted before the valve will close. That function of creating turbulence is provided, in part, by the bias spring structure of FIG. 1. Another construction variation to accomplish the same result would be to increase the area of the rear face of the valve head that was exposed to flow by increasing the outside diameter of the head or by decreasing the outside diameter of the dash pot cylinder just ahead of the valve. However, use of the ring 190 in the embodiment of FIGS. 4 through 8 is attractive because it is easy to calibrate the valve simply by selecting a ring of appropriate size.

One of the advantages of the valves shown in this embodiment is that they will operate to return to open position when the flow line is returned to normal state. In the case of a break in a flow line downstream from the valve, the valve will operate to shut off flow. After the break is repaired, the valve can be reopened simply by applying a back pressure to the line downstream from the valve. If applying a back pressure is not feasible, the valve will still return to its normal open condition after a period of time. Both of these embodiments are made so that there will be a minute leak past the valve head. Eventually, if the downstream line is closed, a quantity of fluid sufficient to increase the downstream pressure will flow through the valve. The valve will then reopen to put the line in service.

The unit shown in FIG. 5 is useful for controlling fluids that might corrode a bias spring of the kind that is used in the unit of FIG. 1 where the bias spring is exposed to the flow path. The embodiment shown in FIGS. 9 through 13 is arranged with a closed cavity in which a biasing element can be housed along with a dash pot so that both are out of the flow stream. The embodiment shown uses a spring as its biasing element. The head of the valve is mounted on an actuating piston which moves with the dash pot piston. When the valve is open, the actuating piston is retracted and it serves to seal off that closed cavity.

The valve head is formed by one face of the actuating piston. The valve is closed by dynamic and static pressure acting on the piston, just as it does in the other embodiments. However, in this case, flow past the piston proceeds through ports in the wall of the valve housing. The flow area of the ports is reduced as the actuating piston is drawn toward the valve seat. If desired, calibration of this structure can be accomplished by altering port area rather than by altering bias force and valve head configuration. Use of the ports provides a production cost advantage in certain cases because the remainder of the structure need not be changed when providing valves which will close at different flow rates.

Turning to FIG. 9, the valve assembly 200 has its downstream end press fitted into a flow line 202 which in turn is telescoped into the end of an upstream flow line 204. Flow proceeds from the right in FIG. 9 through the several ports of the valve. One of those ports is designated by the numeral 206 for identification. Flow enters the valve assembly 200 through the ports and exits through the opening 208 into the line 202 where it continues to flow from right to left in FIG. 9.

The valve assembly is shown in cross-section in FIGS. 10 and 13, and the several parts are shown isometrically in the exploded view of FIG. 12. The assembly consists of a housing 210. The housing is formed of two parts. One is a cylindrical sleeve 212 and the other is an end closure 214 which fits into the upstream end of the sleeve 212. It is not essential that the outer surface of the sleeve be cylindrical, although that form is most convenient. It is not even essential that the interior of the housing be formed as a cylindrical cavity, but the cylindrical arrangement is greatly preferred because it permits use of a piston type dash pot and because the element that responds to gas flow to close the valve is advantageously formed as a piston.

As best indicated in FIGS. 9 and 12, a series of elongated slots are formed through the wall of the sleeve. Those slots are the entry ports for fluid. Four of them are visible in FIGS. 9 and 13 where they are identified by the reference numerals 218, 220, 222, and 224. The slot 224 of FIG. 9 is the lower slot in FIGS. 10 and 13. The upper slot in those two figures is the slot 218 of FIG. 12. The other two slots, 220 and 222, are visible in FIGS. 10 and 13, but are hidden in FIGS. 9 and 12.

The valve is formed by seat 230 and head 232. The head in this embodiment is formed by the downstream face of actuating piston 234. The valve face may be seen in FIG. 11. THe seat is formed by the forward rim of a cylindrical insert 236 which is press fitted into the downstream end of sleeve 212. Its central axial opening 208 forms the flow path through the seat. The seat can be thought of as an inwardly extending flange at the downstream end of the housing sleeve. At its upstream side, the insert or flange is cut away at region 240 around the seat for a purpose to be explained below.

The actuating piston 234 has a sliding fit with the inner wall of the sleeve 212. It is mounted upon a rod 242 that extends axially in the upstream direction. It extends with a sliding fit through the axial opening in a dividing wall 244. The upstream end of the rod 242 is press fitted into a dash pot piston 246 which has a close, sliding fit with the inner wall of sleeve 212. Means are provided for biasing the two pistons and their rod to the position shown in FIG. 10. In this embodiment, that biasing means comprises a coiled compression spring 248 which bears at one end against the dividing wall 244 and at its other end against the downstream face of dash pot piston 246.

In this embodiment, the dividing wall has a central annular portion extending both in the upstream and the downstream direction from the central region of the wall. That extension is formed as a short annular rim about the central opening. At the upstream side, the projection or rim serves to maintain the bias spring 248 centered in the assembly. It is identified by the reference numeral 250 in FIG. 13. The projection at the downstream side is designated 252. It presents a surface against which the rear face of the actuating piston may engage whereby to seal the damping cavity 290 against the entry of foreign matter that might enter between the rod 242 and the dividing wall 244.

The dividing wall separates the hollow housing interior into a valve cavity 280 and a damping cavity 290. The damping cavity is formed by the cylindrical housing, the end plug 214 and by the combination of the rod 242 and the dividing wall 244. Whatever the fluid contained in that chamber, it must flow through the space between the outer circumference of the dash pot piston 246 and the inner wall of the sleeve 212 before the piston 146 is permitted to move through the cavity. The peripheral groove 260 has the effect of interrupting, and making turbulent, the flow from one side of the piston to the other. Thus, provision of that peripheral groove increases the damping action. At low flow rate gas simply proceeds through the line 204 and the severasl slots in the side wall of the valve housing. It flows through those slots into the valve chamber between the seat structure 236 and the dividing wall 244. It proceeds from that chamber through the valve opening 208 into the outlet line 202. The fluid is made turbulent as it flows through the flow ports and over the forward, outer edge of the actuating piston 234. That turbulence has the effect of reducing the pressure at the downstream face of the actuating piston below the static pressure that acts at the upstream side of the actuating piston. As flow increases, that effect becomes more pronounced. At some high value of flow rate, the downstream pressure is reduced to the point where the pressure at the rear face of the piston exceeds the bias force of bias spring 248 and the static resistance against movement of the piston and rod assembly, then the pistons begin to move in the downstream direction. The force of the bias spring 248 increases as the piston assembly is displaced in the downstream direction. However, movement of actuating piston 234 serves to close off the several areas of the flow ports. The fluid will accellerate as it moves through the ports, and the degree of that accelleration will increase as the piston 234 approaches the seat 230. Eventually, the piston will move downstream sufficiently so that its foward face engages the seat 230 and the valve will be closed. Thereafter, the static pressure at the upstream side of the valve acting on the differential area of the piston 234 against the bias spring 248 will maintain the valve closed.

In this model, the front face of the actuating piston 234 has a groove formed across it. That groove is identified by the reference numeral 264. It permits a small amount of gas to leak through the valve. Let it be supposed that actuation of the valve is accomplished as a result of increased flow occasioned by a rupture in the flow line downstream from the valve assembly. The valve will close to permit loss of gas through the leak. If the rupture is repaired, pressure in the downstream line will eventually be returned to normal by fluid leaking through the groove 264 past the seat 230. When enough gas has leaked to the downstream side, pressure there will be restored to the point where the static pressure on the actuating piston 234 is less than the force of the bias spring 248. When the condition is obtained, the piston 234 will be retracted to the position shown in FIG. 10 and the fluid line will be restored to normal operation without any need to touch the valve assembly or even to locate its position in the line.

That automatic reopening feature makes the valve especially suitable as a protective device in the supply line to each consumer in a consumer gas distribution system. A rupture or accidental disconnection of the gas line in the consumer's residence will result in a great increase in gas flow velocity. That increase is sensed in the safety valve of the invention. The valve closes to shut off the supply. If the break is repaired and flow is turned off at each gas using appliance, the line downstream from the valve will eventually fill with gas through the leak past the valve head until the system is returned to normal pressure. At that time, the valve will open. Thereafter, reopening the shut off valves of the appliances and relighting pilot flames will restore the system to normal operation without any need to touch the safety valve.

Consumer gas often contains very fine particulate matter, usually very fine grains of sand. That sand tends to collect at discontinuities in the gas flow path. Such discontinuitites are introduced when a shutoff valve is placed in the flow line. In the preferred construction shown in the drawings, the valve seat is arranged so that it forms an annular shoulder which projects back from the structure on which it is formed, leaving a recess or pocket, such as the recess 240 in FIG. 10. Sand finds may collect in the recess away from the head and seat faces where they might prevent proper valve operation.

The valve of FIGS. 9 through 13 has the advantage that it can be made to close at different flow rates by changing the number or width, or both, of the flow ports or slots in the housing wall.

Although we have shown and described certain specific embodiments of my invention, we are fully aware that many modifications thereof are possible. My invention, therefore, is not to be restricted except insofar as is necessitated by the prior art.

We claim:

1. An excess flow and pressure differential responsive safety valve for use in a fluid flow path, comprising in combination:

a generally elongated and hollow cylindrical body including openings therein for receiving fluid flow from said flow path into said body, said body having a closed upstream end and an open downstream end;

an annular valve seat means at said downstream end of said body, said seat means including an axial flow opening therein to permit fluid flow out of the downstream end of said body;

a valve cavity within said body upstream of said seat means;

actuating valve piston means in said valve cavity for axial movement therein and having an upstream and a downstream face and also having an open position in spaced relation to said seat means and a closed position in which the downstream face is in contact with said seat means, said piston means having its periphery, downstream face and at least a portion of its upstream face generally exposed to fluid flow from said openings, said openings being located in the wall of said body upstream of said seat means and opening into said valve cavity;

a divider wall in said body upstream of said openings and in downstream spaced relation to said closed upstream end to define a damping cavity separated from said valve cavity by said divider wall and which damping cavity is generally closed to fluid flow within said valve cavity;

rod guide receiving means in said divider wall for slidably receiving rod means for axial movement therein and for restricting radial movement thereof;

rod means attached to the upstream face of said piston means and extending generally axially rearwardly through said rod guide receiving means and into said damping cavity;

biasing means within said damping cavity operatively connected to said rod means for normally urging said piston means away from said seat to said open position when fluid flow in said valve body is within preselected velocity and pressure ranges;

said piston means and rod means being designed to move axially in said body upon the occurrence of said preselected fluid flow pressures and velocities which overcome the force of said biasing means so that said piston means moves to said closed postion and engages said seat means; and said body includes damping means connected to said rod means for opposing actuating valve piston means movement in a degree variable with the velocity of valve piston means movement.

2. The invention according to claim 1 and in which a movable dash pot piston is secured to said rod means within said damping cavity and wherein said biasing means is a spring member located in said damping cavity for urging said valve piston means to its normally open position.

3. The invention according to claim 2 and in which said openings are generally axially elongated, circumferentially spaced apart slots in said body wall which slots extend from a position behind the upstream face of said valve piston means to a point rearwardly of said seat means such that movement of the valve piston means operates to alter the area of flow through said openings.

4. The invention according to claim 3 and in which said seat means is of sufficiently reduced diameter to allow the downstream face of said valve piston means to engage the same when in the closed position.

5. The invention defined in claim 4, including means carried by said actuating piston for sealing said damping cavity from said valve cavity as an incident to retraction of said actuating piston.

6. The invention defined in claim 1 in which said seat means comprises a cylindrical flange extending inwardly from the inner wall of said valve cavity and which further comprises means in the form of a cavity formed in said valve seat radially outwardly of and at the side of said seat away from said axial flow opening for collecting fine particulate matter.

7. The invention defined in claim 1 which further comprises means for leaking a preselected amount of gas past said valve notwithstanding closure of said valve.

8. The invention defined in claim 7 and in which said means for leaking gas past said valve is a groove of preselected size in the downstream face of said valve piston means.

* * * * *